Mar. 5, 1929.  T. H. THOMAS  1,703,907
TRAIN CONTROL DEVICE
Filed Sept. 13, 1927
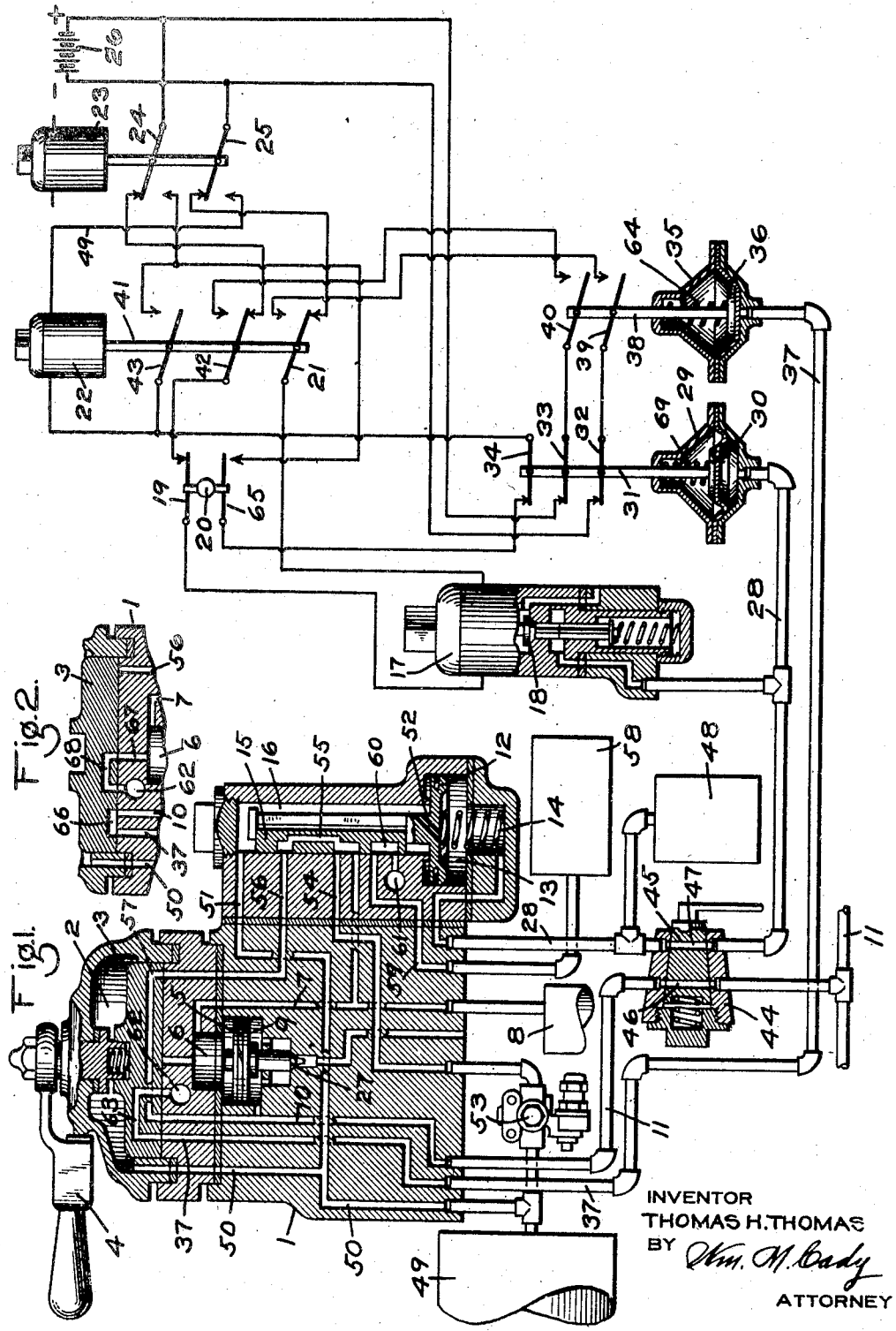
INVENTOR
THOMAS H. THOMAS
BY *Wm. M. Cady*
ATTORNEY Patented Mar. 5, 1929.

1,703,907

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-CONTROL DEVICE.

Application filed September 13, 1927. Serial No. 219,200.

This invention relates to railway train control apparatus, and more particularly to a train control equipment in which the engineer may suppress or prevent an application of the brakes by operation of the train control equipment when passing a signal which gives a restrictive indication.

The principal object of my invention is to provide a brake application suppressing means of the above character, in which the suppressing means is electro-pneumatically controlled.

Other objects and advantages will appear in the following more detailed description of the invention.

In the accompanying drawing; Fig. 1 is a diagrammatic view of a train control apparatus embodying my invention; and Fig. 2 a fragmentary view of the brake valve device shown in Fig. 1, with the rotary valve thereof in service application position.

The equipment may comprise a brake valve device 1 having a valve chamber 2 containing a rotary valve 3 adapted to be operated by handle 4. The brake valve device also includes an equalizing discharge valve mechanism comprising a piston 5 having chamber 6 at one side connected through passage 7 with an equalizing reservoir 8 and the chamber 9 at the opposite side connected through passage 10 with the brake pipe 11, the piston 5 being adapted to operate a brake pipe discharge valve 27.

Preferably, though not necessarily, associated with the brake valve device is an application valve device comprising a piston 12 contained in a piston chamber 13 and subject to the pressure of a spring 14, and a slide valve 15, contained in valve chamber 16 and adapted to be operated by piston 12.

A magnet valve device, comprising a magnet 17 and a valve 18, controls the venting of fluid from piston chamber 13, and one terminal of magnet 17 is connected to a contact finger 19 of an acknowledging switch device 20. The other terminal of the magnet is connected to a contact finger 21 adapted to be operated by an acknowledging relay 22.

A decoding relay 23, which is deenergized when passing a signal giving a restricted indication, operates contact fingers 24 and 25, the finger 24 being connected to the plus side of a source of current 26 and the finger 25 to the negative side.

Connected by pipe 28 to the piston chamber 13 of the application valve device is a fluid pressure controlled device comprising a casing 29 containing a flexible diaphragm 30. The diaphragm 30 carries a stem 31 for operating contact fingers 32, 33, and 34. A brake application suppression device is provided comprising a casing 35 containing a flexible diaphragm 36, having the chamber at one side connected to a pipe and passage 37 which leads to the seat of the rotary valve 3.

The diaphragm 36 is adapted to operate a stem 38 and the stem 38 is adapted to operate contact fingers 39 and 40. The acknowledging relay 22 operates a stem 41 which is adapted to operate contact fingers 42 and 43, as well as the contact finger 21.

A cut-out cock device 44 is provided having a valve 45 with ports 46 and 47, adapted in the open position of the cock to establish communication through the brake pipe 11 to the engineer's brake valve and through pipe 28 to the application valve device, and connected to the pipe 28 is a timing reservoir 48.

In operation, when the signal gives a clear indication, the decoding magnet 23 is energized and the contact fingers 24 and 25 are held in the position shown in the drawing. The circuit of the acknowledging relay 22 is open, since the contact finger 25 is in a position in which the wire 49 from one terminal of the relay is disconnected from the source of current 26. The relay 22 being deenergized, the contact fingers 21, 42, and 43 are held in the positions shown in the drawing. A circuit through the magnet 17 is thus closed from the positive lead of the source of current 26, through contact finger 24, contact finger 42, contact finger 19 of the acknowledging switch, through magnet 17, contact finger 21, and contact finger 25 to the negative lead of the source of current. The magnet 17 being energized, the valve 18 is held seated.

Fluid under pressure from the main reservoir 49 is supplied through passage 50 to the rotary valve chamber 2 and also through passage 51 to valve chamber 16. Fluid from valve chamber 16 equalizes through a port 52 into piston chamber 13 and the magnet controlled valve 18 being seated, the pressure builds up to the pressure carried in the main reservoir as well as in the timing reservoir 48. Fluid pressure from pipe 28 also acts on diaphragm 30 and operates said diaphragm to hold the stem 31 and the contact fingers 32, 33, and 34 in the positions shown in the drawing.

With the fluid pressures equalized on opposite sides of the application piston 12, spring 14 maintains piston 12 and slide valve 15 in the position shown, in which fluid under pressure is supplied from the usual feed valve device 53 to the brake pipe 11, through passage 54, cavity 55 in slide valve 15, passage 56, and the brake valve being in running position, as shown, through cavity 57 in rotary valve 3 and passage 10 to the brake pipe 11. The equalizing reservoir 8 is also charged with fluid under pressure from the feed valve device 53 through a portion of the cavity 55. In the above position of the slide valve 15, a reduction reservoir 58 is connected to the atmosphere through passage 59, cavity 60, and exhaust port 61.

In the running position of the engineer's brake valve, pipe 37 is connected to an atmospheric exhaust port 62 through cavity 63 in the rotary valve 3, so that the diaphragm 36 of the brake application suppression device is held in the position shown by the spring 64.

If the signal changes from clear to a restrictive indication, the relay 23 will be deenergized. The contact fingers 24 and 25 are then moved so as to open the circuit of the magnet 17 and thereby the magnet 17 being deenergized, the valve 18 is unseated and fluid under pressure is vented from piston chamber 13 of the application valve device and from the timing reservoir 48 at a predetermined rate. If the engineer fails to move the acknowledging switch 19, then after a predetermined time, the pressure in piston chamber 13 will be reduced sufficiently to permit the fluid pressure in valve chamber 16 to shift the piston 12 to its outer application position, in which slide valve 15 is moved, so that communication through which fluid is supplied from the feed valve device 53 to the brake pipe 11 is cut off and the equalizing reservoir 8 is connected to the reduction reservoir 58. The fluid pressure is thus reduced in the piston chamber 6 of the equalizing discharge valve mechanism, so that piston 5 is operated in the usual manner to unseat the valve 27 and cause fluid under pressure to be vented from the brake pipe 11, whereby an application of the brakes is effected. The automatic brake application as above described may be prevented if the engineer first moves the acknowledging switch 20 and then operates the brake valve device to effect an application of the brakes.

When the acknowledging switch is shifted to its lower position, a circuit is completed through the acknowledging relay 22 through contact finger 65, contact finger 24, through the source of current 26, contact finger 25, wire 49, through acknowledging relay 22, and contact finger 34 back to contact finger 65. The acknowledging relay 22 is thus energized and the stem 41 is moved to shift the contact fingers 21, 42, and 43 to their upper positions. When the stem 41 is moved upwardly, a circuit is closed through the relay 22 from the source of current 26 through contact finger 24, contact finger 43, relay 22, and contact finger 25, so that the acknowledging relay 22 is maintained energized. The engineer may now permit the switch 20 to return to its normal position as shown in the drawing. The engineer must now move the brake valve device to application position, as shown in Fig. 2, in order to prevent an automatic application of the brakes. In this position, pipe 37 is connected to the brake pipe 11 through cavity 66 in the rotary valve 3, so that fluid under pressure is supplied to diaphragm 36 of the brake application suppression device. The diaphragm 36 is then operated to shift the stem 38 upwardly, so that the contact fingers 39 and 40 are moved to close a circuit whereby the magnet 17 is held energized, the circuit being from the contact finger 40, through contact finger 42, contact finger 19, through magnet 17, contact finger 21, contact finger 39, contact finger 32, through the source of current 26, and contact finger 33, back to contact finger 40.

The magnet 17 being energized by the above operations, if accomplished before the pressure in the timing reservoir 48 and in piston chamber 13 has been reduced sufficiently to cause the movement of the application piston 12 to application position, will prevent an automatic brake application, but the movement of the engineer's brake valve to application position causes the brakes to be applied in the usual manner, by the venting of fluid under pressure from the equalizing reservoir chamber 6 of the equalizing discharge valve mechanism, by way of passage 67, cavity 68 in the rotary valve 3, and exhaust port 62.

If, however, the pressure in piston chamber 13 is allowed to reduce sufficiently to cause the application piston 12 to be moved outwardly, before the engineer acts, then the diaphragm 30 will be moved by its spring 69, owing to the reduced pressure acting on the diaphragm, so that the stem 31 is operated to shift the contact fingers 32, 33, and 34. The circuit controlled by the contact fingers 39 and 40 is thus opened by the movement of contact fingers 32 and 33, so that the magnet 17 will not be energized by the operation of the suppression diaphragm 36 to close the circuit at the contact fingers 39 and 40. It will thus be evident that if an automatic application is once started, it cannot be stopped by the engineer.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a train control apparatus, the combination with means for automatically effecting an application of the brakes, of electrically controlled means adapted when energized to prevent the operation of said brake application means, means for manually effecting an application of the brakes, and means operated upon manually effecting an application of the brakes for closing a circuit through which said electrically controlled means is energized.

2. In a train control apparatus, the combination with means for automatically effecting an application of the brakes, of electrically controlled means adapted when energized to prevent the operation of said brake application means, means for manually effecting an application of the brakes, means operated upon applying the brakes manually for controlling a circuit through which said electrically controlled means may be energized, and manually operated means for also controlling said circuit.

3. In a train control apparatus, the combination with means for automatically effecting an application of the brakes, of electrically controlled means adapted when energized to prevent the operation of said brake application means, manually operated means for effecting the energization of said electrically controlled means, and means adapted upon operation of said automatic brake application means to prevent the energization of said electrically controlled means.

4. In a train control apparatus, the combination with means for automatically effecting an application of the brakes, of electrically controlled means adapted when energized to prevent the operation of said brake application means, a signal controlled relay for controlling the circuit of said electrically controlled means, an acknowledging switch, a relay controlled by said switch for controlling the circuit of said electrically controlled means, means operated upon applying the brakes manually for controlling said circuit, and means operated upon applying the brakes automatically for controlling said circuit.

5. In a train control apparatus, the combination with means for automatically effecting an application of the brakes, of electrically controlled means adapted when energized to prevent the operation of said brake application means, and means operated upon deenergization of said electrically controlled means for opening a circuit through which said electrically controlled means may be energized.

6. In a train control apparatus, the combination with means for automatically effecting an application of the brakes, of electrically controlled means adapted when energized to prevent the operation of said brake application means, means operated upon manually applying the brakes for closing a circuit through which said electrically controlled means may be energized, and means operated upon automatically applying the brakes for opening said circuit.

7. In a train control apparatus, the combination with means for automatically effecting an application of the brakes, of electrically controlled means adapted when energized to prevent the operation of said brake application means, means operated upon manually applying the brakes for closing a circuit through which said electrically controlled means may be energized, and means operated upon deenergization of said electrically controlled means for preventing the closing of said circuit.

8. In a train control apparatus, the combination with a valve device operated upon a reduction in fluid pressure for effecting an application of the brakes and electrically controlled means adapted upon deenergization to vent fluid pressure from said valve device, of means operated by the venting of fluid pressure from said valve device for opening a circuit through which said electrically controlled means may be maintained energized.

In testimony whereof I have hereunto set my hand.

THOMAS H. THOMAS.

DISCLAIMER 1,703,907.—*Thomas H. Thomas*, Edgewood, Pa. TRAIN-CONTROL DEVICE. Patent dated March 5, 1929. Disclaimer filed July 8, 1933, by the assignee, *The Westinghouse Air Brake Company*, the executrix of said Thomas H. Thomas, deceased, Mabel M. Thomas, concurring and assenting.

Hereby enters this disclaimer to that claim which is in the following words:

"8. In a train control apparatus, the combination with a valve device operated upon a reduction in fluid pressure for effecting an application of the brakes and electrically controlled means adapted upon deenergization to vent fluid pressure from said valve device, of means operated by the venting of fluid pressure from said valve device for opening a circuit through which said electrically controlled means may be maintained energized."

[*Official Gazette August 1, 1933.*]